US006451156B2

(12) United States Patent
Kishioka et al.

(10) Patent No.: US 6,451,156 B2
(45) Date of Patent: Sep. 17, 2002

(54) PRESSURE-SENSITIVE ADHESIVE SHEETS AND METHOD OF FIXING FUNCTIONAL FILM

(75) Inventors: Hiroaki Kishioka; Masahiro Ohura; Takao Yoshikawa, all of Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 17 days.

(21) Appl. No.: 09/789,068

(22) Filed: Feb. 20, 2001

(30) Foreign Application Priority Data

Feb. 24, 2000 (JP) ........................................ 2000-052243

(51) Int. Cl.$^7$ .............................................. C09J 101/00
(52) U.S. Cl. ........................ 156/329; 428/429; 525/101
(58) Field of Search ........................ 156/329; 428/429; 525/101, 317.1, 318

(56) References Cited

FOREIGN PATENT DOCUMENTS

| JP | 1-178567 | 7/1989 |
|---|---|---|
| JP | 1-178568 | 7/1989 |
| JP | 10-279900 | 10/1998 |

*Primary Examiner*—Robert Dawson
*Assistant Examiner*—Christopher Keehan
(74) *Attorney, Agent, or Firm*—Knobbe, Martens, Olson & Bear, LLP

(57) ABSTRACT

A pressure-sensitive adhesive sheets comprising a layer of a crosslinked pressure-sensitive adhesive, which is formed by an acrylic polymer made of a homopolymer or copolymer of a monomer containing a (meth)acrylate as a principal component, a silane coupling agent and a crosslinking agent, wherein a sol component of the crosslinked pressure-sensitive adhesive has a weight-average molecular weight of not less than 300,000 and a proportion of a low-molecular component having a molecular weight of not more than 100,000 in the sol component is not more than 15% by weight in the measurement of the molecular weight by the gel permeation chromatography method, which the sheet cause neither lifting nor formation of bubbles at the bonding interface even when exposed to severe conditions such as high temperature or high temperature and humidity in case a functional film is bonded/fixed to a display device, thus making it possible to maintain good appearance for a long period.

11 Claims, No Drawings

PRESSURE-SENSITIVE ADHESIVE SHEETS AND METHOD OF FIXING FUNCTIONAL FILM

BACKGROUND OF THE INVENTION

1. Field of the Invention

The present invention relates to sheet- or tape-shaped pressure-sensitive adhesive sheets, which are used to fix a functional film to a display device.

2. Description of the Related Art

Pressure-sensitive adhesive sheets have recently been utilized in various fields because of good bonding operation properties. Among these, pressure-sensitive adhesive sheets comprising, as a base component, a homopolymer or copolymer of a monomer containing, as a base, an acrylic polymer (i.e. an alkyl (meth)acrylate) are superior in durability performances such as weathering resistance, heat resistance, deterioration resistance and the like. Therefore, they are used particularly preferably in the fields where these durability performances are required.

As one of uses of pressure-sensitive adhesive sheets, for example, there has been known a use of bonding/fixing functional films such as conductive film, antiglare film and the like to a display device (glass surface thereof). In view of use such as display device to which severe requirements on the appearance is made, it is required for these pressure-sensitive adhesive sheets to cause neither lifting nor formation of bubbles at the bonding interface when exposed to severe conditions such as high temperature or high temperature and humidity (e.g. inside of automobiles or warehouses in the summer season) for a long time, not to mention at the beginning of standing after bonding/fixing, thus making it possible to maintain good appearance.

To resolve these requirements, it is suggested to use acrylic pressure-sensitive adhesive sheets comprising an acrylic polymer, as a base component, and a silane coupling agent incorporated into the acrylic polymer, thereby to improve the adhesion to the glass surface. Although use of the pressure-sensitive adhesive sheets improves the adhesion to glass to some extent, there still remains such a problem that lifting and formation of bubbles occur at the bonding interface when exposed to severe conditions such as high temperature or high temperature and humidity (e.g. inside of automobiles or warehouses in the summer season) for a long time, thus making it hard to maintain good appearance.

SUMMARY OF THE INVENTION

In light of the circumstances described above, an object of the present invention is to provide pressure-sensitive adhesive sheets for fixing a functional film to a display device, having excellent weathering resistance which cause neither lifting nor formation of bubbles at the bonding interface even when exposed to severe conditions such as high temperature or high temperature and humidity (e.g. inside of automobiles or warehouses in the summer season) for a long time, thus making it possible to maintain good appearance.

As a result of an intensively study about the object described above, the present inventors have found that pressure-sensitive adhesive sheets having excellent weathering resistance, wherein the pressure-sensitive adhesive has a crosslinked structure, are obtained by incorporating a silane coupling agent into an acrylic polymer and crosslinking the acrylic copolymer, and a sol component of the crosslinked pressure-sensitive adhesive having a specific molecular weight distribution with less low-molecular component, and that, when a functional film is bonded/fixed to a display device using the resulting pressure-sensitive adhesive sheets, neither lifting nor formation of bubbles occurs at the bonding interface even during the weathering evaluation test, thus making it possible to maintain good appearance for a long period, whereby the present invention has been completed.

That is, the present invention is directed to a pressure-sensitive adhesive sheet comprising a layer of a crosslinked pressure-sensitive adhesive, which is formed by an acrylic polymermade of a homopolymer or copolymer of a monomer containing a (meth) acrylate as a principal component, a silane coupling agent and a crosslinking agent, wherein a sol component of the crosslinked pressure-sensitive adhesive has a weight-average molecular weight of not less than 300,000 and a proportion of a low-molecular component having a molecular weight of not more than 100,000 in the sol component is not more than 15% by weight in the measurement of the molecular weight by the gel permeation chromatography method. Also the present invention is directed to a method of fixing a functional film, which comprises bonding/fixing the functional film to a display device through the pressure-sensitive adhesive sheets with the constitution described above.

As used herein, the sol component of the layer of the crosslinked pressure-sensitive adhesive refers to a sol component which is a soluble polymer dissolved in ethyl acetate when a predetermined amount Mo (about 0.5 g) of the above layer is covered with a fluororesin film having numerous pores (diameter: 0.2 $\mu$m), followed by dipping in ethyl acetate at 20° C. for 240 hours. The sol fraction thereof is determined by calculating from the formula: (Mt/Mo)×100 (% by weight) where Mt is an amount of the sol component and Mo is an initial weight before dipping.

Using the above soluble polymer (sol component), the weight-average molecular weight of the sol component and the proportion (% by weight) of the low-molecular component having a molecular weight of not more than 100,000 were determined from a molecular weight distribution curve by the gel permeation chromatography method (hereinafter referred to as the GPC method). The measuring conditions of the molecular weight distribution curve by the GPC method are as follows: concentration of sample; 1 mg/ml, amount of sample introduced; 500 mg, column temperature; 40° C., and flow rate; 1.0 ml/minute.

As used herein, the term "pressure-sensitive adhesive sheets" is a general term for pressure-sensitive adhesive tapes and various adhesive products (e.g. pressure-sensitive adhesive labels) having the shape which resembles closely to that of the pressure-sensitive adhesive tapes.

DETAILED DESCRIPTION OF THE INVENTION

The acrylic polymer used as the base polymer in the present invention is a homopolymer or copolymer of a monomer containing an alkyl (meth)acrylate as a principal component, and the other monomer, capable of copolymerizing with the alkyl (meth)acrylate, can be used in combination with the alkyl (meth)acrylate.

The alkyl (meth)acrylate is a monomer represented by the following general formula:

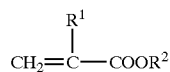

wherein $R^1$ is a hydrogen atom or a methyl group, and $R^2$ is an alkyl group having 1 to 18 carbon atoms. Specific examples thereof include methyl (meth)acrylate, ethyl (meth)acrylate, propyl (meth)acrylate, butyl (meth)acrylate, 2-ethylhexyl (meth)acrylate, octyl (meth)acrylate, nonyl (meth)acrylate, lauryl (meth)acrylate and the like.

The copolymerizable monomer, for example, there can be used any of various monomers, which are known as a monomer for modification of an acrylic pressure-sensitive adhesive, such as vinyl acetate, styrene, (meth)acrylonitrile, (meth)acrylamide, (meth)acrylic acid, 2-hydroxyethyl (meth)acrylate, 4-hydroxybutyl (meth)acrylate, 6-hydroxyhexyl (meth)acrylate, glycidyl (meth)acrylate, N,N-dimethylaminoethyl (meth)acrylate and the like. These copolymerizable monomers are usually used in the proportion of not more than 50% by weight based on the total amount of the alkyl (meth)acrylate and the copolymerizable monomer.

Such an acrylic polymer is preferably a polymer which exhibits a proper molecular weight distribution before crosslinking, particularly the low-molecular component exhibits a molecular weight smaller than as usual, so that the sol component has a weight-average molecular weight of not less than 300,000, preferably not less than 500,000 (usually up to 5,000,000), and the amount of a low-molecular component having a molecular weight of not more than 100,000 is not more than 15% by weight, preferably not more than 10% by weight by weight in the measurement of the molecular weight by the gel permeation chromatography method after forming a crosslinked structure by the acrylic polymer, the silane coupling agent and the crosslinking agent. The molecular weight constitution of the sol component after crosslinking can be easily set within the above range by using the acrylic polymer with such a constitution to a proper crosslinking treatment.

Before crosslinking, the acrylic polymer with the above constitution can be obtained, for example, by polymerizing due to a solution polymerization method, an emulsion polymerization method or a bulk polymerization method using a polymerization initiator such as azo compound orperoxide, orphotopolymerizing due to irradiation with light using a photopolymerization initiator, or polymerizing due to irradiation with radiation to obtain an acrylic polymer, adding an organic solvent capable of dissolving on a low-molecular component, and removing only the low-molecular component with separating; or adding a required additive to the polymer, forming the mixture into a tape, and treating the tape with the same organic solvent as described above, thereby to elute the low-molecular component.

According to alternative method of forming the acrylic polymer with the above constitution, an acrylic polymer with less low-molecular component can be obtained by using a polymerization solvent having a small chain transfer coefficient in the solution polymerization and polymerizing at the temperature as low as possible due to an increase of the monomer concentration, or employing the photopolymerization method using a photopolymerization initiator, that is, selecting the operation conditions on polymerization. The polymerization operation and the operation of removing the low-molecular component after polymerization may be appropriately used in combination.

In the present invention, examples of the silane coupling agent to be incorporated into the acrylic polymer include vinyltrichlorosilane, vinyltris (β-methoxyethoxy)silane, vinyltriethoxysilane, vinyltrimethoxysilane, γ-methacryloxypropyltrimethoxysilane, β-(3,4-epoxycyclohexyl)ethyltrimethoxysilane, γ-glycidoxypropyltrimethoxysilane, γ-glycidoxypropyltriethoxysilane, N-β(aminoethyl)γ-aminopropyltrimethoxysilane, N-β(aminoethyl)γ-aminopropylmethyldimethoxysilane, γ-aminopropyltriethoxysilane, N-phenyl-γ-aminopropyltrimethoxysilane, γ-chloropropyltrimethoxysilane and the like.

The amount of the silane coupling agent is usually within a range from 0.001 to 5 parts by weight, and preferably from 0.01 to 1 parts by weight, based on 100 parts by weight of the acrylic polymer. When the amount of the silane coupling agent is too small, the adhesion to the display device (glass) can not be sufficiently improved. On the other hand, when the amount is too large, an adverse influence is likely to be exerted on the bonding properties, which is not preferred.

In the present invention, in case the silane coupling agent is incorporated into the acrylic polymer and the acrylic polymer is crosslinked with the crosslinking agent, the kind and amount of the crosslinking agent are appropriately selected so that the sol fraction after crosslinking, that is, the proportion of the soluble polymer is usually within a range from 5 to 60% by weight, and preferably from 10 to 40% by weight, and the weight-average molecular weight with respect to the sol component after crosslinking and the proportion of the lower-molecular component having a molecular weight of not more than 100,000, which are determined by the measurement of the molecular weight by the gel permeation chromatography method, are within the above range.

The crosslinking agent include conventionally known crosslinking agents, a polyfunctional melamine compound and/or a polyfunctional epoxy compound are particularly preferred. Specific examples thereof include methylatedmethylolmelamine, butylated hexamethylolmelamine, diglycidylaniline, glycerin diglicidyl ether and the like. The amount of the crosslinking agent is usually within a range from 0.001 to 10 parts by weight, and preferably from 0.01 to 5 parts by weight, based on 100 parts by weight of the acrylic polymer.

Use of a polyfunctional isocyanate compound is also preferred, and examples of such a compound include tolylene diisocyanate, hexamethylene diisocyanate, polymethylenepolyphenyl isocyanate, diphenylmethane diisocyanate, trimethylolpropanetolylene diisocyanate, polyether polyisocyanate, polyester polyisocyanate and the like. The amount of such a compound is usually within a range from 0.01 to 20 parts by weight, and preferably from 0.05 to 15 parts by weight, based on 100 parts by weight of the acrylic polymer.

The pressure-sensitive adhesive sheets of the present invention has a layer of the pressure-sensitive agent crosslinked with the crosslinking agent, which usually has a thickness within a range from 5 to 500 μm, and preferably from 10 to 100 μm. This layer may be formed into a sheet or tape by forming on one or both surfaces of a transparent substrate made of a plastic film having a thickness within a range from 10 to 1,000 μm, or may be formed into the same form described above with no substrate by forming on a proper release liner.

These pressure-sensitive adhesive sheets have an adhesive strength to glass of not less than 300 g/20 mm width, and preferably not less than 400 g/20 mm width (usually preferably not more than 2000 g/20 mm width), and are used particularly preferably as an adhesive fixing material for fixing composite films having various functions, which usually have a thickness within a range from about 50 to 200 μm (for example, functional films such as conductive film, antiglare film, heat ray screening film, anti-reflective sheet, etc.) to a display device (glass surface thereof)

In the present invention, in order to fix the above functional film to the display device, the both are bonded/fixed through the pressure-sensitive adhesive sheets. Usually, the pressure-sensitive adhesive sheets are applied to the functional film and the resultant is applied to the display device (glass surface thereof). Whereby, the functional film can be fixed with good adhesive strength without causing lifting and formation of bubbles at the bonding interface when exposed to severe conditions such as high temperature or high temperature and humidity (e.g. inside of automobiles or warehouses in the summer season) for a long time, not to mention at the beginning of standing after bonding, thus making it possible to maintain good appearance for a long term.

The reason why such an effect is exerted is not apparent, necessarily. The present inventors consider the reason as follows. That is, an improvement in adhesion to the adherend (display device: glass, etc.) due to incorporation of the silane coupling agent and the constitution of the polymer wherein the amount of the low-molecular component in the sol component after is reduced after crosslinking with the crosslinking agent exerts an action of inhibiting a gas evolved from the pressure-sensitive adhesive sheets, the functional film or the like from causing formation of bubbles and lifting.

EXAMPLES

The present invention will be described in more detail by way of the following Examples. In the Examples, parts are by weight unless otherwise stated. Acrylic polymer solutions A to C used in the following Examples and Comparative Examples are prepared by the following manners.

<Acrylic Polymer Solution A>

70 Parts of 2-ethylhexyl acrylate, 25 parts of n-butyl acrylate, 5 parts of acrylic acid, 0.06 parts of 3-hydroxypropyl acrylate, and 45 parts of ethyl acetate as a polymerization solvent were charged in a three-necked flask, followed by stirring while introducing a nitrogen gas for two hours. After removing oxygen in the polymerization system, 0.2 parts of benzoyl peroxide was added and the mixture was reactedby heating to 60° C. for ten hours, then reacted by heating to 75° C. for two hours. To the reaction solution, ethyl acetate was added to obtain an acrylic polymer solution A having a solid content of 45% by weight.

<Acrylic Polymer Solution B>

To 100 parts of the acrylic polymer solution A, 120 parts of n-heptane was added dropwise while stirring over six hours. After left to stand for 24 hours, the supernatant was separated. To the polymer solution after separating the supernatant, toluene was added and dissolved and, furthermore, the operation of adding 120 parts of n-heptane and separating the supernatant in the same manner as described above was repeated five times. To the final polymer solution thus obtained, 80 parts of toluene was added, followed by concentration to obtain an acrylic polymer solution B having a solid content of 25% by weight.

<Acrylic Polymer Solution C>

The acrylic polymer solution A and the acrylic polymer solution B were mixed in a weight ratio of 1:1 to obtain an acrylic polymer solution C having a solid content of 35% by weight.

Example 1

To 100 parts of the acrylic polymer solution B, 1.5 parts of tolylene diisocyanate and 0.09 parts of γ-glycidoxypropyltrimethoxysilane were added to prepare a pressure-sensitive adhesive solution. This solution was spread over a substrate made of a polyethylene terephthalate film having a thickness of 188 μm so that the thickness after drying becomes 25 μm, dried with heating at 130° C. for three minutes and then aged at 50° C. for 72 hours to form a pressure-sensitive adhesive sheet for measurement of the adhesive strength, which has a layer of a crosslinked pressure-sensitive adhesive. In the same manner as described above, a pressure-sensitive adhesive sheet for measurement of the weathering resistance, comprising a release liner made of a polyethylene terephthalate film having a thickness of 38 μm and a layer having a thickness of 25 μm of a crosslinked pressure-sensitive adhesive formed on the release liner was produced.

Example 2

To 100 parts of the acrylic polymer solution C, 3 parts of diphenylmethane diisocyanate and 0.12 parts of γ-methacryloxypropyltrimethoxysilane were added to prepare a pressure-sensitive adhesive solution. In the same manner as in Example 1, a pressure-sensitive adhesive sheet for measurement of the adhesive strength and a pressure-sensitive adhesive sheet for measurement of the weathering resistance were produced.

Comparative Example 1

To 100 parts of the acrylic polymer solution C, 0.8 parts of trimethylolpropanetolylene diisocyanate and 0.15 parts of β-(3,4-epoxycyclohexyl)trimethoxysilane were added to prepare a pressure-sensitive adhesive solution. In the same manner as in Example 1, a pressure-sensitive adhesive sheet for measurement of the adhesive strength and a pressure-sensitive adhesive sheet for measurement of the weathering resistance were produced using the resulting pressure-sensitive adhesive solution.

Comparative Example 2

To 100 parts of the acrylic polymer solution B, 3 parts of trimethylolpropanetolylene diisocyanate was added to prepare a pressure-sensitive adhesive solution. In the same manner as in Example 1, a pressure-sensitive adhesive sheet for measurement of the adhesive strength and a pressure-sensitive adhesive sheet for measurement of the weathering resistance were produced using the resulting pressure-sensitive adhesive solution.

With respect to the pressure-sensitive adhesive sheets for measurement of the adhesive strength and pressure-sensitive adhesive sheets for measurement of the weathering resistance of Examples 1 and 2 and Comparative Examples 1 and 2, the adhesive strength test and weathering evaluation test were performed in the following procedures. These results are as shown in Table 1. In Table 1, the presence or absence of the silane coupling agent in the pressure-sensitive adhesive solution as well as the sol fraction, the weight-average molecular weight as measured by the GPC method and the proportion of the low-molecular component having the molecular weight of not more than 100,000 with respect to the sol component of the layer of the crosslinked pressure-sensitive adhesive are also shown for reference.

<Adhesive Strength Test>

Specimens having a width of 20 mm and a length of 120 mm were made from the pressure-sensitive adhesive sheet for measurement of the adhesive strength. Each of these specimens was laminated on a glass plate by moving rollers (2 kg) back and forth once under the atmosphere at 23° C., and then the peel strength was measured at the same temperature using a Tensilon type peeling tester at a peeling rate of 300 mm/minute.

<Weathering Evaluation Test>

Samples were made by laminating the pressure-sensitive adhesive sheet for measurement of the weathering resistance on a polyethylene terephthalate film having a thickness of 125 μm and fixing the laminate to glass. The weathering evaluation test was performed by exposing each of the resulting samples to the atmosphere at a temperature of 80 or 60° C. and a humidity of 95% RH for each 500 hours. After the completion of the weathering evaluation test, samples where any of appearance defects such as formation of bubbles and lifting is not visually observed at the bonding interface were rated "○", whereas, samples where formation of bubbles and lifting are slightly observed were rated "×".

TABLE 1

|  |  | Example 1 | Example 2 | Comparative Example 1 | Comparative Example 2 |
|---|---|---|---|---|---|
| Silane coupling agent | | contained | contained | contained | none |
| Sol component | Sol fraction (% by weight) | 15 | 10 | 15 | 29 |
|  | Weight-average molecular weight (×10,000) | 58 | 47 | 49 | 58 |
|  | Low-molecular component (% by weight) | 6 | 12 | 25 | 6 |
| Adhesive strength test (g/20 mm width) | | 550 | 590 | 620 | 500 |
| Weathering evaluation test | | ○ | ○ | X | X |

As is apparent from Table 1, the pressure-sensitive adhesive sheets of Examples 1 and 2 according to the present invention exhibit good adhesive strength according to the molecular weight constitution of the sol component in the layer of the crosslinked pressure-sensitive adhesive, and also exhibit excellent weathering resistance because any of formation of bubbles and lifting does not occur at the bonding interface after the weathering evaluation test. On the other hand, the pressure-sensitive adhesive sheet of Comparative Example 1 wherein the molecular weight constitution of the sol component is not within the scope of the present invention, and the pressure-sensitive adhesive sheet which has a molecular weight constitution of the sol component within the scope of the present invention but contains no silane coupling agent of Comparative Example 2 are inferior in weathering resistance.

As described above, pressure-sensitive adhesive sheets having excellent weathering resistance, wherein a sol component having a specific molecular weight distribution with less low-molecular component, are obtained by incorporating a silane coupling agent into an acrylic polymer and crosslinking the acrylic copolymer. When a functional film is bonded/fixed to a display device using the resulting pressure-sensitive adhesive sheets, neither lifting nor formation of bubbles occurs at the bonding interface even during the weathering evaluation test, thus making it possible to maintain good appearance for a long period.

What is claimed is:

1. A pressure-sensitive adhesive sheet comprising a layer of a crosslinked pressure-sensitive adhesive, which is formed by an acrylic polymer made of a homopolymer or copolymer of a monomer containing a (meth)acrylate as a principal component, a silane coupling agent and a crosslinking agent, wherein a sol component of the crosslinked pressure-sensitive adhesive has a weight-average molecular weight of not less than 300,000 and a proportion of a low-molecular component having a molecular weight of not more than 100,000 in the sol component is not more than 15% by weight in the measurement of the molecular weight by the gel permeation chromatography method.

2. The pressure-sensitive adhesive sheet according to claim 1, wherein the amount of the silane coupling agent is within a range from 0.001 to 5 parts by weight based on 100 parts by weight of the acrylic polymer.

3. The pressure-sensitive adhesive sheet according to claim 1, wherein a sol fraction of the sol component of the layer of the crosslinked pressure-sensitive adhesive agent is within a range from 5 to 60% by weight.

4. The pressure-sensitive adhesive sheet according to claim 1, wherein the adhesive strength to glass is not less than 300 g/20 mm width.

5. A method of fixing a functional film, which comprises bonding/fixing the functional film to a display device through the pressure-sensitive adhesive sheets of claim 1.

6. The pressure-sensitive adhesive sheet according to claim 2, wherein a sol fraction of the sol component of the layer of the crosslinked pressure-sensitive adhesive agent is within a range from 5 to 60% by weight.

7. The pressure-sensitive adhesive sheet according to claim 2, wherein the adhesive strength to glass is not less than 300 g/20 mm width.

8. The pressure-sensitive adhesive sheet according to claim 3, wherein the adhesive strength to glass is not less than 300 g/20 mm width.

9. A method of fixing a functional film, which comprises bonding/fixing the functional film to a display device through the pressure-sensitive adhesive sheets of claim 2.

10. A method of fixing a functional film, which comprises bonding/fixing the functional film to a display device through the pressure-sensitive adhesive sheets of claim 3.

11. A method of fixing a functional film, which comprises bonding/fixing the functional film to a display device through the pressure-sensitive adhesive sheets of claim 4.

* * * * *